Feb. 6, 1962 IKURO MORIYA 3,020,355

MAGNETIC RECORDING AND REPRODUCING SYSTEM

Filed Sept. 20, 1960

United States Patent Office 3,020,355
Patented Feb. 6, 1962

3,020,355

MAGNETIC RECORDING AND REPRODUCING SYSTEM

Ikuro Moriya, Kanagawa-ku, Yokohama, Japan, assignor to Victor Company of Japan, Limited, Yokohama, Japan, a corporation of Japan Filed Sept. 20, 1960, Ser. No. 57,167
Claims priority, application Japan Oct. 2, 1959
3 Claims. (Cl. 179—100.2)

This invention relates to a magnetic recording and reproducing system wherein, while a magnetic sheet coated with a magnetic material on one surface is being horizontally run in a certain direction, a plurality of magnetic heads are brought into contact with the magnetic material coated on the surface of said magnetic sheet and are made to alternately scan the magnetic sheet toward either directions from the center of the sheet or vice versa so as to record and play back sounds.

As a conventional system of this type, there has already been suggested a system wherein, while in contact with the magnetic material coated surface of a horizontal stationary magnetic sheet, one magnetic head is or alternately a plurality of magnetic heads are moved in a certain direction with respect to the magnetic sheet so as to record or play back sounds. However, in such conventional system, as the magnetic sheet is not run, there are disadvantages that not only recording and playing back cannot be carried out continuously for a long time but also, in order that recording and playing back may be carried out continuously for a long time, the apparatus must be bulky. There is another disadvantage that, in the case of transferring the recording of a magnetic sheet in which sounds have been recorded by such conventional system, the recording direction of the sound track on the magnetic sheet to which the recording has been transferred will become reverse to that of the original magnetic sheet and therefore, in the case of playing back with such transferred sheet, the magnetic head will have to be moved in the counter direction to that for recording.

The magnetic recording and reproducing system according to the present invention is suggested to eliminate such defects as are mentioned above.

A principal object of the present invention is to provide a recording and reproducing system wherein continuous recording and playing back can be efficiently carried out for a long time with a compact apparatus.

Another object of the present invention is to provide a magnetic recording and reproducing system wherein the transfer of the recording of a magnetic sheet in which sounds have been recorded is easy.

A further object of the present invention is to provide a magnetic recording and reproducing system wherein it is made possible to comparatively easily write letters or pictures on the back of a magnetized surface during continuous recording and playing back.

The system of the present invention shall now be described more particularly with reference to the drawings.

Figure 2:
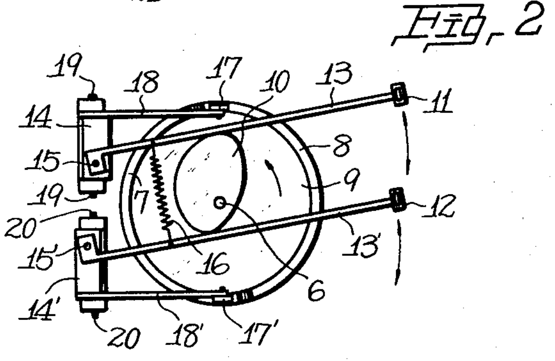
FIGURE 2 is a top plan view therefor.
Figure 3:
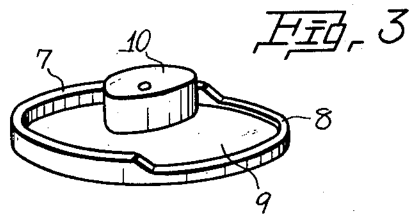
FIGURE 3 is a perspective view of a cam used in the system of the present invention.
Figure 4:
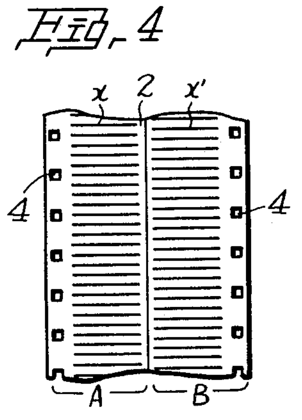
FIGURE 4 is a plan view of a magnetic sheet in which sounds have been recorded by the system of the present invention.

In the drawings, 1 is a magnetic sheet feeding roll, 2 is a magnetic sheet in which perforations 4 are on both edges as shown in FIGURE 4. 3 is a sprocket wheel engaging with said perforations 4. When this wheel is rotated in the direction indicated by the arrow, the magnetic sheet 2 will be run in the direction indicated by the arrow. 5 is a motor to rotate a rotary disk 9. The sprocket wheel 3 is to be rotated by an operatively connecting device not illustrated. As shown in FIGURE 3, the structure of said rotary disk 9 has a high edge part 7 formed in a substantially half part of the periphery in the peripheral edge and has a low edge part 8 formed in the other substantially half part of said periphery, the boundaries of said high edge part 7 and low edge part 8 being connected with each other through smooth curves. As described later, the difference between the heights of the high edge part 7 and low edge part 8 is to determine the distance of the vertical motion of magnetic heads 11 and 12 to be in contact with the magnetic material coated surface of the magnetic sheet 2. A shaft 6 is attached to the center of the rotary disk 9. A cam 10 is fixed to said shaft 6. As evident in FIGURES 2 and 3, the profile of said cam 10 is parabolic in a substantially half part of its periphery and is nearly arcuate in the other substantially half part of the periphery. As described later the strict profile of said cam is so determined as to give the magnetic heads 11 and 12 a moving velocity and a reciprocating moving distance as required. The magnetic heads 11 and 12 are secured to the forward ends of supporting rods 13 and 13', respectively, which are pivoted at the other ends to rotary base plates 14 and 14' by means of rotary shafts 15 and 15', respectively. Said rotary base plates 14 and 14' are rotatably supported by shafts 19 and 20, respectively. Arms 18 and 18' are secured to the rotary base plates 14 and 14', respectively. Rollers 17 and 17' are provided at the forward ends of the arms 18 and 18', respectively. Said rollers 17 and 17' are always pressed against the high edge part 7 or the low edge part 8 of the peripheral edge of the rotary disk 9 by means of springs 21. Further, a spring 16 is stretched between the supporting rods 13 and 13' so that the insides of said supporting rods 13 and 13' may be always pressed by said spring against the outside of the cam 10.

Now the movements of the rollers 17 and 17' and arms 18 and 18' shall be explained. As the rollers 17 and 17' are pressed against the high edge part 7 or the low edge part 8 of the rotary disk 9 by the springs 21, when the rotary disk 9 rotates and the roller 17 comes into contact with the high edge part 7, the roller 17 will rise, the free end of the arm 18 will also rise together with it. Therefore, the rotary base plate 14 will rotate around the shaft 19 as a center and the magnetic head 11 at the forward end of the supporting rod 13 pivoted by the rotary shaft 15 to said rotary base plate will rise into contact with the lower surface or magnetic material coated surface of the magnetic sheet 2. When the roller 17 comes into contact with the low edge part 8 of the rotary disk 9, the magnetic head 11 will fall off from the lower surface of the magnetic sheet 2. Further, the roller 17', arm 18' and magnetic head 12 will also operate the same as the above described roller 17, arm 18 and magnetic head 11, respectively. By such operation, with the rotation of the rotary disk 9, the magnetic heads 11 and 12 will move up and down alternately so as to come into contact with the lower surface of the magnetic sheet 2.

The function of the cam 10 shall now be explained. As the supporting rods 13 and 13' are always kept in contact with both sides of the cam 10 by the spring 16, when the rotary disk 9 rotates in the direction indicated by the arrow, the supporting rods 13 and 13' will move rightward and leftward, therefore the magnetic head 11 at the forward end of the supporting rod 13 will move on the left half surface A of the magnetic sheet 2 as shown in FIGURE 4 and the magnetic head 12 at the forward end of the supporting rod 13' will likewise move on the right half surface B of the magnetic sheet 2. As the cam 10 is so formed as to be substantially parabolic on one half surface and substantially arcuate on the other half surface, when the magnetic head 11 moves, for example, toward the left outside edge from the central part of the magnetic sheet, the supporting rod 13 will be in contact with the parabolic surface of the cam 10 and the magnetic head 11 will move at a constant velocity. On the contrary, when it moves toward the central part from the outside part, said supporting rod 13 will be in contact with the arcuate surface of the cam 10 and the head will quickly return to the central part. It is needless to say that the magnetic head 12 moves the same as the magnetic head 11.

Figure 1:
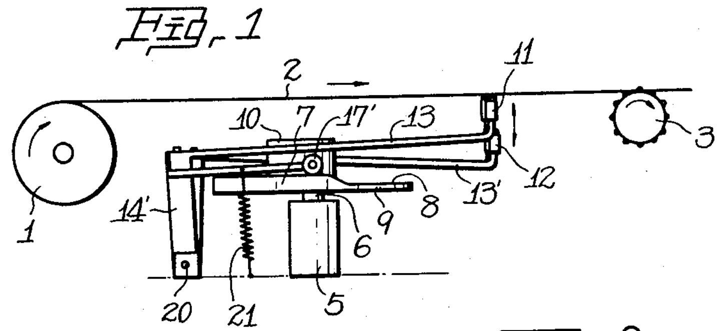
FIGURE 1 is a schematic side view of the system of the present invention.
Figure 5:
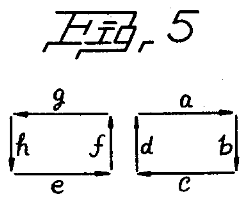
FIGURE 5 is an explanatory view of the operations of magnetic heads in the system of the present invention.

There shall now be explained the manner in which the high edge part 7 and low edge part 8 of the rotary disk 9 in cooperation with the cam 10 move the magnetic heads 11 and 12. In case the magnetic sheet 2 moves in the direction indicated by the arrow in FIGURE 1 and the rotary disk 9 rotates as indicated by the arrow in FIGURE 2, one magnetic head 12 will move as shown by *a*, *b*, *c* and *d* in FIGURE 5 and recording and playing back will be made in *a* and the other magnetic head 11 will be moved as shown by *e*, *f*, *g* and *h* in FIGURE 5 with respect to said magnetic head 12 and recording and playing back will be made in *g*. In short, while one magnetic head is in contact with the magnetic material coated surface of the magnetic sheet and is recording or reproducing sounds, the other magnetic head will separate from the magnetic sheet, will be ready for the next recording or playing back, will come into contact with the magnetic sheet just before the recording or playing back by the first magnetic head finishes and will carry out the next recording or playing back. By repeating such operation, recording or playing back can be carried out in such tracks as are shown by lines *x* and *x'* toward both side edges from the center on the magnetic material coated surface of the magnetic sheet 2 as shown in FIGURE 4.

Further, in the present invention, the direction of the tracks of recording or playing back by the magnetic heads may be toward the center from both sides of the magnetic sheet, the number of the magnetic heads may be two or more, any other mechanism than is illustrated in the drawings may be used to move the magnetic heads.

In the present invention, as recording tracks are formed on substantially all the surface of the magnetic sheet which is continuously fed, recording and playing back can be carried out at a high efficiency for a long time with a comparatively compact apparatus. As the recording tracks are formed in the right and left opposite directions in both half parts bounded in the center of the sheet, in the case of transferring the recording by overlapping a new magnetic sheet on the magnetic sheet in which sounds have been recorded, the recording direction of the recording tracks of said magnetic sheet to which the recording is to be transferred will be the same as that of the original sheet. Therefore, in playing back the recording of the magnetic sheet to which the recording has been transferred, the moving direction of the magnetic head need not be made reverse to that of the case of recording. Further, the moving velocity of the magnetic sheet can be made so comparatively low that letters or pictures can be written comparatively easily on the back surface of the magnetic sheet during recording or playing back.

What I claim is:

1. A magnetic sound recording and reproducing system comprising a magnetic sheet coated with a magnetic material on one surface, means for moving the sheet in one direction, at least two parallel supporting rods each having a magnetic head fitted at one end and, at the other end, a pivoting part movable to right and left with respect to said sheet, at least two arms related with said rods each arm having a vertically movable roller at one end, a rotary disk provided with a centrally disposed cam member substantially one-half of the periphery of which is parabolic and the other half is substantially arcuate, said disk also being provided with a high edge part on substantially one-half of the peripheral surface and with a low edge part on the other substantially half part of said peripheral surface for moving said arms alternately up and down into and out of contact with said magnetic material-coated surface, and means related with said cam member for reciprocating said supporting rods and hence said magnetic heads.

2. A magnetic sound recording and reproducing system according to claim 1 wherein, when one of said magnetic heads is sliding on the magnetic material-coated surface of said magnetic sheet, before said magnetic head separates from said magnetic material-coated surface another magnetic head comes into contact with the magnetic material-coated surface.

3. A magnetic recording and reproducing system according to claim 1 wherein, for a little while just before recording by one magnetic head finishes, recording by the other magnetic head is carried out as overlapped.

References Cited in the file of this patent

UNITED STATES PATENTS 2,869,876 Brassur ---------------- Jan. 30, 1959